(12) United States Patent
Lauke

(10) Patent No.: US 8,421,262 B2
(45) Date of Patent: Apr. 16, 2013

(54) GENERATOR ARRANGEMENT FOR A WIND POWER PLANT

(75) Inventor: Andreas Lauke, Gruibingen (DE)

(73) Assignee: Schuler Pressew GmbH & Co. KG, Göppingen (DE)

( * ) Notice: Subject to any disclaimer, the term of this patent is extended or adjusted under 35 U.S.C. 154(b) by 491 days.

(21) Appl. No.: 12/661,020

(22) Filed: Mar. 9, 2010

(65) Prior Publication Data

US 2010/0264664 A1  Oct. 21, 2010

(30) Foreign Application Priority Data

Apr. 17, 2009 (DE) .................. 10 2009 017 865

(51) Int. Cl.
  *F03D 9/00* (2006.01)
(52) U.S. Cl.
  USPC ............................................. 290/55; 290/44

(58) Field of Classification Search ..................... 290/55
  See application file for complete search history.

(56) References Cited

U.S. PATENT DOCUMENTS

| | | | |
|---|---|---|---|
| 6,483,199 B2 * | 11/2002 | Umemoto et al. ............. | 290/55 |
| 7,205,678 B2 * | 4/2007 | Casazza et al. ................. | 290/55 |
| 7,736,125 B2 * | 6/2010 | Bagepalli et al. ............. | 415/126 |
| 2010/0026010 A1 * | 2/2010 | Pabst ............................. | 290/55 |

FOREIGN PATENT DOCUMENTS

DE  44 02 184 C2  11/1995

* cited by examiner

*Primary Examiner* — Michael Zarroli
(74) *Attorney, Agent, or Firm* — R. S. Lombard; K. Bach

(57) ABSTRACT

In the generator arrangement according to the invention at least one main bearing is arranged between the generator and the hub wherein the rotor of the generator is supported only on the front end of a rigid carrier in the form of a support disc (30). The support disc is a hollow chamber structure of low weight and high rigidity.

15 Claims, 5 Drawing Sheets

GENERATOR ARRANGEMENT FOR A WIND POWER PLANT

CROSS-REFERENCE TO RELATED APPLICATION

This application claims the priority benefits of German Application No. 10 2009 017 865.1 filed Apr. 17, 2009.

BACKGROUND OF THE INVENTION

The invention resides in a generator arrangement for wind energy utilization. Plants for wind energy utilization generally comprise a vertical extending tower on the top of which a gondola is supported so as to be rotatable about a vertical axis. The gondola supports a generator which is usually driven by a three-blade rotor. One of the employed drive concepts is a direct drive wherein the hub of the rotor carrying the blades is connected to the rotor of a generator directly without an intermediate transmission.

Such a concept is shown in DE 44 02 184 C2, wherein the generator is in the form of an external rotor. The stator and the rotor of the generator are joined by a resilient bearing structure which is arranged within the generator and which supports the rotational movement of the rotor as well as forces and movements introduced from without. The stator is connected to the head of the tower, that is, the gondola of the wind power plant by way of a first flange. The rotor is connected to the rotor hub by way of a second flange. The bearing structure is supported by a stationary hollow shaft journal via which access to the rotor hub from the tower head is facilitated.

The arrangement of the main bearing within the directly driven generator can result in problems regarding the establishment of a sufficiently rigid support structure.

In connection with large, directly driven generators in the power output range of several megawatts, it is very important to control the dynamic loads and vibration or oscillation excitations caused by the electro-magnetic forces by a sufficiently rigid support structure for the magnetically and electrically active components. At the same time, however, the weight of the generator is an important expense factor. It results not only in generator material consumption, that is costs, but also affects directly the expenditures involved in the design and constrictions of the gondola, the tower and the foundation of the wind power plant. In addition, there are respective transport costs and mounting expenditures.

It is therefore the object of the present invention to provide an improved wind power plant.

SUMMARY OF THE INVENTION

With the generator arrangement according to the invention at least one main bearing is arranged between the generator and the hub wherein the rotor of the generator is supported only on the front end of a rigid carrier in the form of a support disc 30. The support disc 30 is a hollow chamber structure of low weight and high rigidity.

The wind power plant according to the invention is supported by a central support tube which, at one end thereof, is connected to the gondola frame and which extends from the connecting location in a cantilevered fashion. The generator arrangement includes a generator with a preferably annular stator and also an annular external rotor. The generator preferably does not have its own individual bearing structure. For centering the rotor with respect to the stator an annular carrier is provided which is arranged concentrically with the support tube and is supported rotatably relative thereto. The annular carrier is connected to the annular rotor via a rigid support disc, which has a generator-side wall and a hub-side wall. Between the two walls reinforcement structures are provided. Adjacent the hub-side wall the hub carrying the blades is arranged.

This set-up permits the arrangement of the bearings between the generator and the hub and the very sturdy structure for the support tube as well as the support disc provided for establishing a connection between the support and the rotor. The double wall support structure of the support disc together with a preferably also double-walled support structure of the stator provides for a good, distortion-free accommodation of the effective forces. With the arrangement of the main bearing outside of the generator, the arrangement consisting of the support tube and the support structure of the stator can be optimized with respect to its rigidity while a clear structure and a low over-all weight are obtained. The double-wall support structure with radial webs or, respectively, ribs for the rotor and the stator of the generator make it possible to achieve a high rigidity at a relatively low weight. This has a positive effect on the resonance frequency of the arrangement and consequently the oscillation or vibration behavior of the generator. The generator and the whole wind power plant can be made more cost effective and weight-optimized.

The arrangement of the main bearings between the generator and the hub minimizes bearing load.

With the concept disclosed herein a support tube of a particularly large diameter can be used. This results in a rigid structure of low weight. The radial height of the support structure of the generator, in particular the support disc of the rotor and the support structure of the stator can be kept small which clearly enhances the rigidity.

The bearing structure may comprise exclusively bearings which are arranged between the hub and the generator. Such a main bearing structure is also called a moment bearing, because it supports the rotationally supported hub and the rotor of the generator not only in radial direction but it also accommodates moments effective about the transverse axis and the vertical axis. Alternatively a support tube may be provided which extends into the hub or through the hub wherein the main bearing then is formed by two axially spaced bearings. With a design using moment bearings good access to the rotor hub is ensured.

Independently of whether a moment bearing or two axially spaced bearing are used, the gondola, that is, the machine carrier, is free of elements of the generator and the main bearing. It can therefore be designed for optimum strength and rigidity. Access to the tower is not inhibited.

Preferably the rotor extends in a cantilevered fashion away from the support disc. It is therefore supported only at one end thereof. With the high rigidity of the support disc in the form of a hollow structure the precise maintenance of operating air clearances in the generator is possible with the required accuracy. The rigidity of the support disc supports its capability of the sleeve-like rotor to remain undistorted so that the desired air gaps are maintained.

Particulars of advantageous embodiments of the invention will be described below in greater detail with reference to the accompanying drawings.

DETAILED DESCRIPTION OF PARTICULAR EMBODIMENTS

Figure 1:
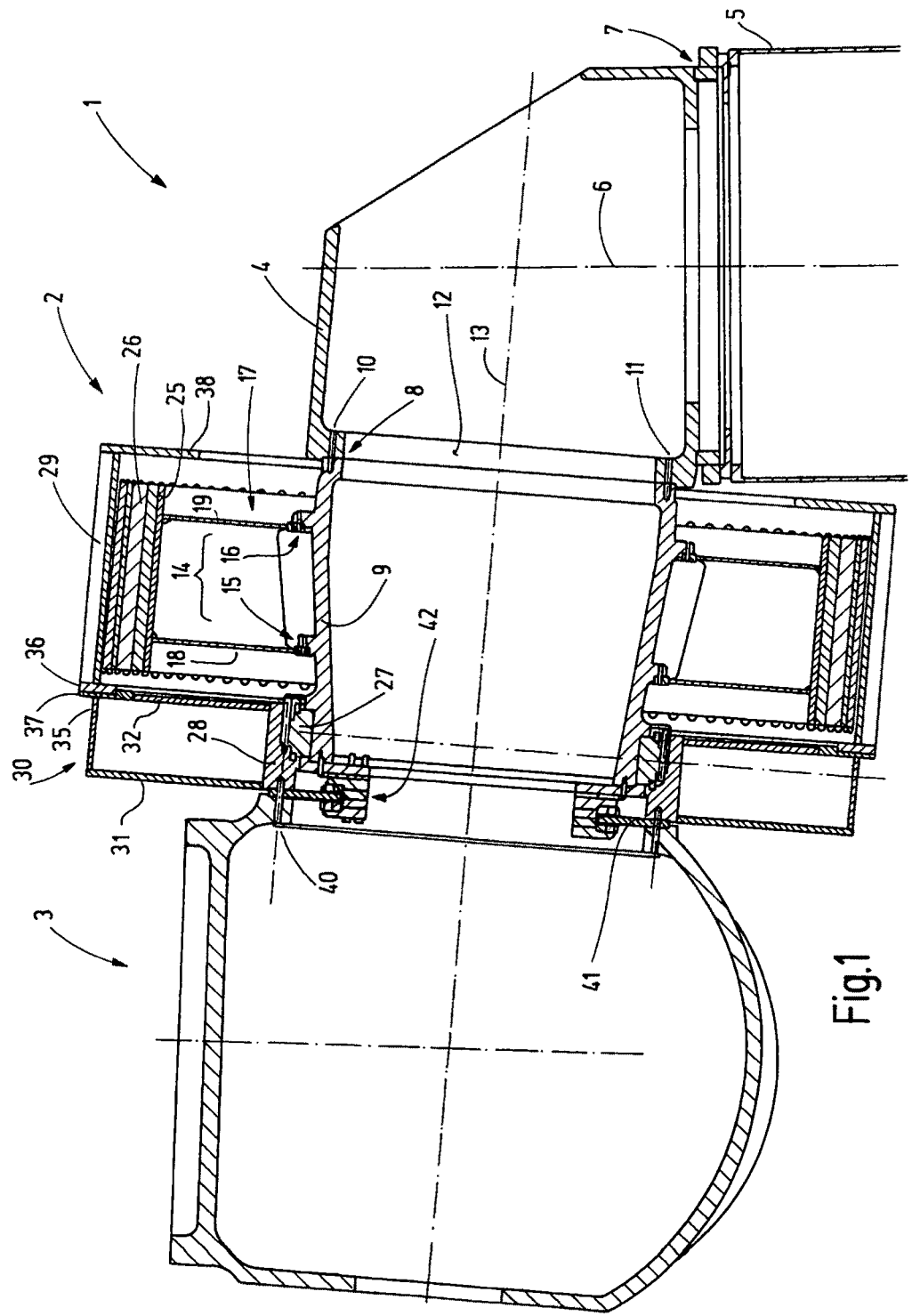
FIG. 1 shows a first embodiment of the generator arrangement in a vertical cross-sectional view.

FIG. 1 shows a tower head 1 with a generator 2 and a hub 3 of a wind power plant. The tower head includes a machine carrier 4 which is supported at the upper end 5 of the tower so as to be rotatable about a vertical axis 6. To this end the tower is provided with a tower bearing 7.

In the shown embodiment the machine carrier 4 is relatively compact. It extends sidewardly only slightly beyond the upper end 5 of the tower. At one side, in FIG. 1 at the left, the machine carrier 4 is provided with a support structure 8 for supporting a support tube 9 forming a stationary axle. The support tube 9 is provided at its side adjacent the machine carrier 4 with a precisely machined annular surface which forms a sealing surface to which a corresponding annular surface formed on the machine carrier 4 is assigned. The annular surface of the machine carrier 4 may be surrounded by an annular stepped area so that the support tube is seated on the machine carrier 4 in a centered manner. As indicated only schematically in FIG. 1 bolts 10, 11 extend through the inwardly projecting edge of the machine carrier 4 which edge extends around an opening 12 and fixes the support tube 9 with respect to the machine carrier 4.

The opening 12 extends as a passage into the carrier tube 9 which has an about horizontal center axis 13 or, as shown, is slightly inclined upwardly with respect to horizontal line.

The support tube 9 has preferably an internal diameter of at least the height of a man, that is of at least 2 meters. As shown, it may also be somewhat conical such that it becomes slightly narrower from the machine carrier end to the hub end thereof. It may be a cast component of cast steel, cast iron, or another suitable material.

Figure 3:
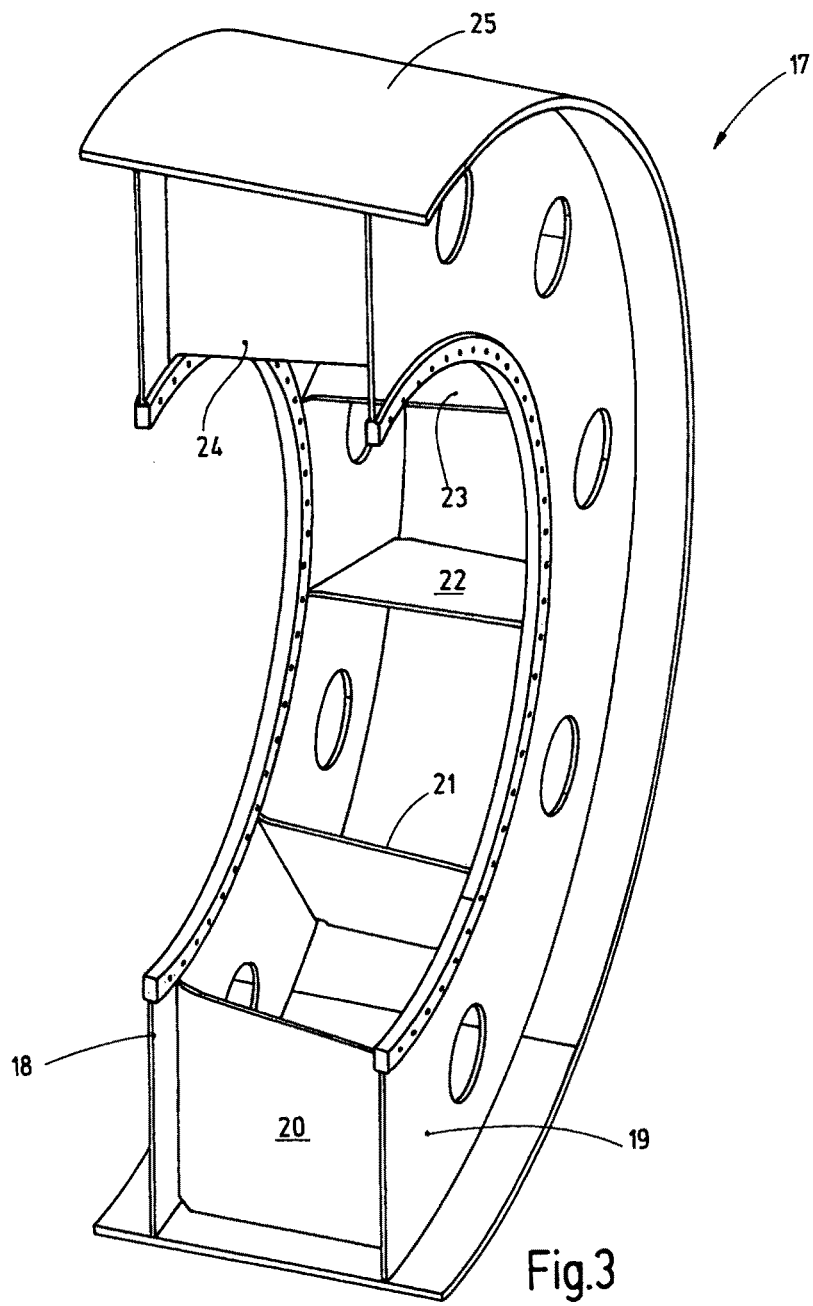
FIG. 3 shows the support structure for the stator according to FIG. 1 in a perspective partially sectional side view.

The generator 2 is supported by the support tube 9. To this end, the support tube 9 is provided at its outer circumference a mounting structure 14. In the shown embodiment the mounting structure 14 includes two axially spaced outwardly directed annular flanges 15, 16 on which a stator support structure 17 is mounted as shown in FIG. 3. The stator support structure 17 includes a hub-side wall 18 and a gondola-side wall 19 which are each provided with a central opening at the edge of which the walls they are bolted to the flanges 15, 16. The two walls 18, 19 are interconnected by intermediate separating walls 20, 21, 22, 23, 24 which extend with respect to the center axis 13 radially and in axial direction. At its outer circumference the stator-support structure 17 has for example a cylindrical support surface 25 on which the stator 26 is disposed. At its inner edges surrounding the central openings the hub-side wall 18 and the gondola-side wall 19 are provided with a reinforcement rim which includes boxes for bolting it to the flanges 15 and 16.

Figure 5:
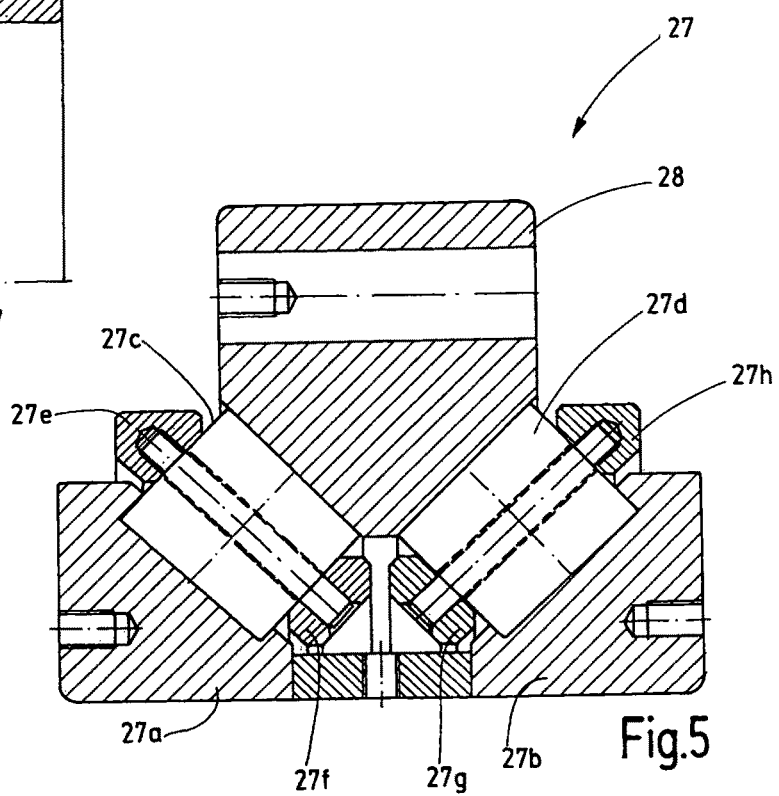
FIG. 5 is a vertical cross-sectional view of a preferred embodiment of a bearing arrangement for main bearing 27 shown in FIG. 1.

The support tube 9 extends through the stator support structure 17 as it is shown in FIG. 1. On the hub-side end of the outer circumference of the support tube 9 a main bearing 27 is disposed as shown in FIG. 1, which main bearing 27 comprises for example one or several ball bearings, roller bearings, tapered roller bearings, spherical roller bearings or similar. The main bearing 27 is provided at the outside with a support ring 28. At opposite sides, the support ring 28 there are opposite inner rings 27a, 27b on which this support ring 28 is supported via tapered rollers 27c, 27d. The inner rings 27a, 27b have running surfaces which, together open outwardly and extend for example at a right angle relative to each other. The tapered rollers may each include a central bearing pin. The bearing pins of each tapered roller annulus may be interconnected by chains or rings 27e, 27f, 27g, 27h. The main bearing 27 is preferably a moment bearing as shown for example in FIG. 5. It supports the support ring 28 concentrically with respect to the center axis 13, so as to be rotatable about this axis. All other degrees of freedom are fixed by the bearing. In particular moments resulting from an asymmetric load application to the hub 3 or the rotor 29 are securely transmitted to the support tube 9.

Figure 2:
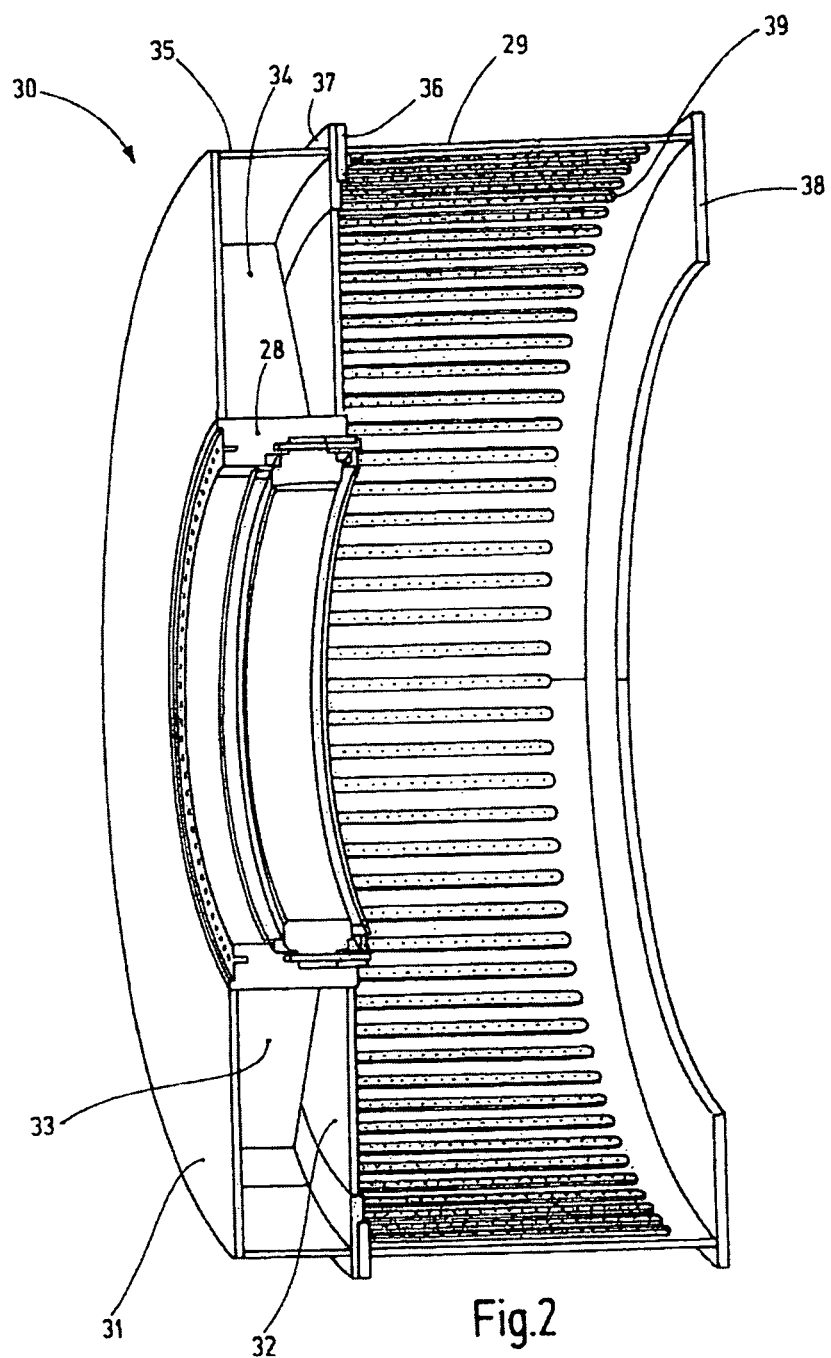
FIG. 2 shows the rotor of the generator shown in FIG. 1 with a front end support disc in a perspective partially sectional.

The support ring 28 is connected to the rotor 29 via a rigid support disc 30 formed as a hollow structure. The support disc 30 comprises a hub-side wall 31 which is arranged for example at the front of the hub-side edge of the support ring 28. It comprises further a generator-side wall 32 which is arranged at the end of the support ring 28 remote from the hub 3. Both walls 31, 32 are preferably flat annular discs which are arranged in spaced relationship. As shown in FIG. 2 between the walls 31, 32 web walls 33, 34 are arranged which extend preferably radially from the support ring 28 and axially between the two walls 31, 32. The radial length of the web walls 33, 34 is preferably so large that they extend from the support ring 28 up to an outer cylindrical end wall 35 which is arranged between the side walls 31, 32. The number of web walls 33, 34 is determined depending on the purpose. Preferably the angle between adjacent web walls 33, 34 is less than 90°, preferably not greater than 45°. The same applies to the web walls 20 to 24.

The diameter of the end wall 35 corresponds preferably about to the diameter of the rotor 29, which as shown in FIG. 2, is provided at its front-end adjacent the hub 3, with a flange 36. The flange 36 has a large number of mounting openings which are aligned with mounting openings of a flange 37 which extends beyond the end wall 35. The hollow cylindrical rotor 29 is provided at its end remote from the support disc 30 with an end ring 38 forming part of an enclosure of the generator 2.

The rotor 29 is provided at its inner wall with a large number of permanent magnets 39 which generate a magnetic field whose relative movement with respect to the stator 26 induces thereon voltages. The stator 26 includes the respective windings and magnetic flux carrying components.

As further shown in FIG. 1, the support ring 28 is connected to the hub 3 via a flange connection. The flange connection comprises a seating surface formed on the front side of the support ring 28 and on other seating surface formed at the rear end of the hub 3. Bolts 40 secure the hub 3 to the support ring 28. Between the hub 3 and the support ring 28 an annular brake disc 41 is provided which is held in the flange connection described. At the front end of the support tube 9 brake calipers 42 are arranged for retaining the hub 3 so as to prevent its rotation.

The generator arrangement as described is largely optimized with respect to its design and also the respective material requirements and assembly needs. The stator 26 as well as the rotor 29 are each supported by hollow support structures with the central main bearing 27 being arranged outside the generator 2 between the generator 2 and the hub 3. The interface areas between the generator 2 and the other components with respect to the rotor are the flanges 36, 37. With respect to the stator they are either at the flanges 36, 37 or the cylindrical support surface 25. As a result, altogether, components which can easily be preassembled and easily be transported and have a comparatively low weight and are of relatively simple designs are obtained.

The generator arrangement described above provides also for easy access to the hub interior through the support tube. The arrangement requires only one main bearing.

Figure 4:
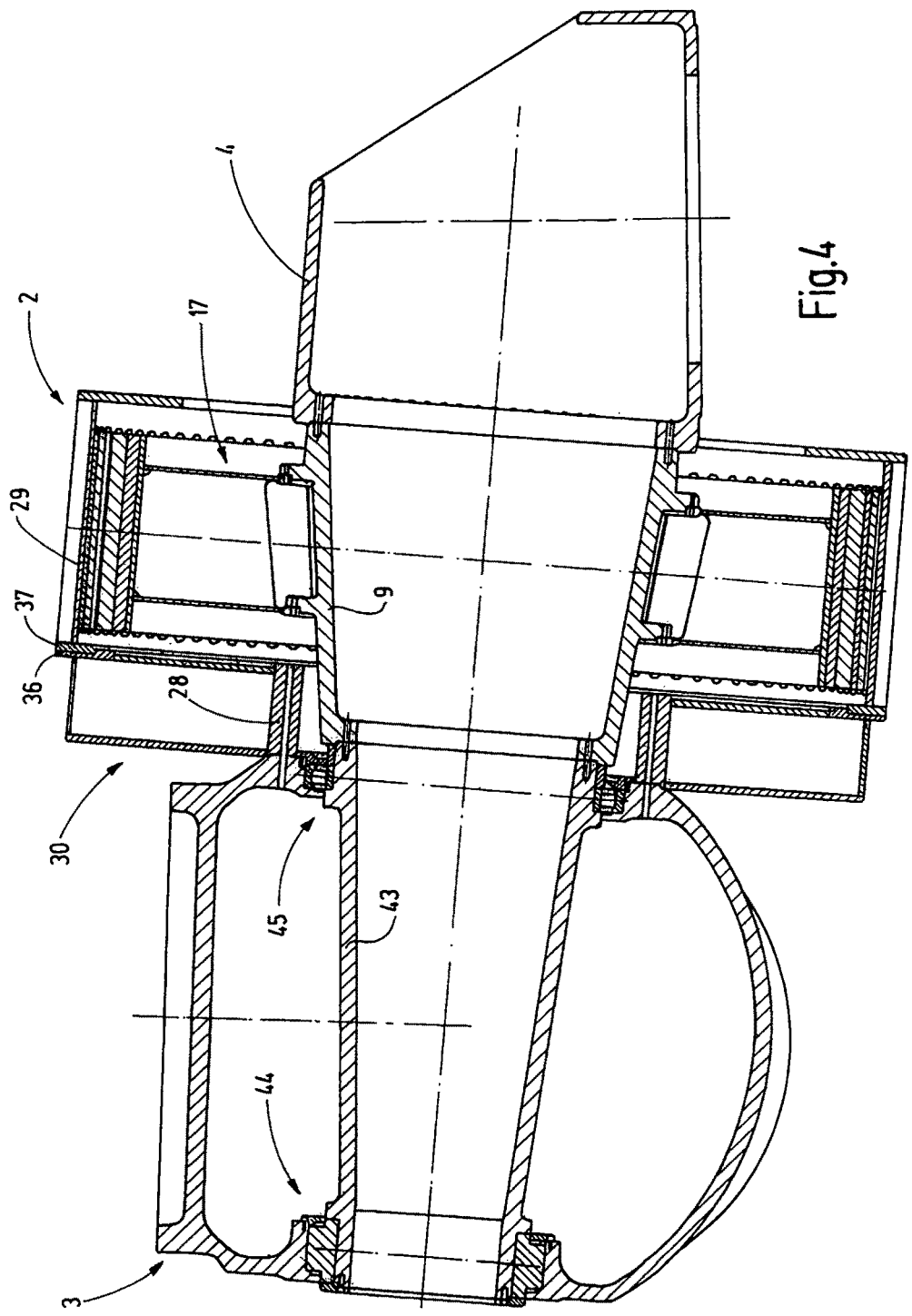
FIG. 4 shows a modified embodiment of the generator arrangement according to the invention in a vertical cross-sectional view.
Figure 6:
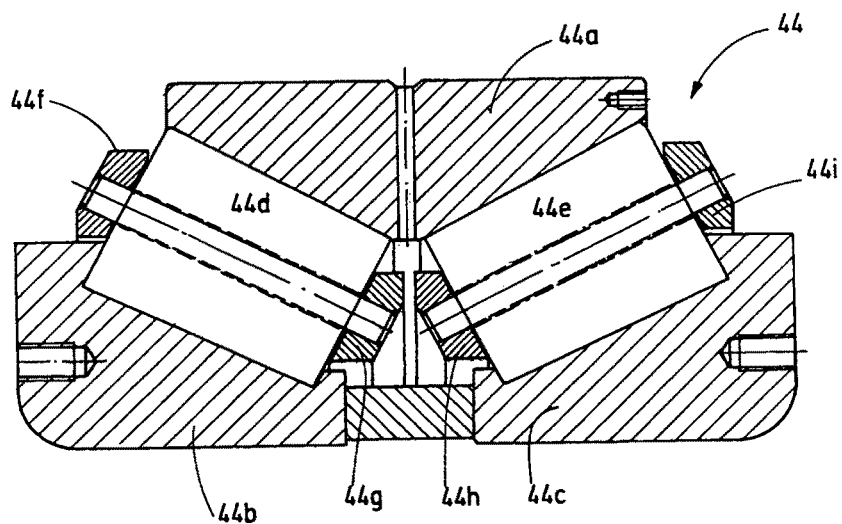
FIG. 6 is a vertical cross-sectional view of an embodiment of a bearing arrangement for bearing 44 shown in FIG. 4; and, FIG. 7 is a vertical cross-sectional view of an embodiment of a bearing arrangement for bearing 45 shown in FIG. 4.
Figure 7:
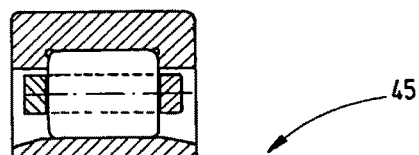

FIG. 4 shows a modified embodiment of the arrangement described above, wherein a support tube extension 43 which is mounted to the front end of the support tube 9 and which forms a bearing carrier. The support tube extension 43 and the support tube 9 are joined by a flange connection as it is described in the first embodiment for mounting the brake calipers 42. It is therefore possible to use for this design the same support tube as described earlier. Also the other parts, particularly the generator components 2, the stator support structure 17 and the support disc 30 are essentially identical with the components described for the first embodiment. However, the bearing structure is different. It renders in a combination of two bearing 44, 45 which are axially spaced from each other and arranged preferably at the ends of the support tube extension 43 and of a design as shown for example in FIGS. 6 and 7. The support tube extension 43 may be provided with a manhole which may be arranged between the two bearings 44, 45 and via which service personnel can enter the hub 3.

The bearing 44 comprises an outer ring 44a which has two running surfaces arranged preferably at an obtuse angle. The outer ring 44a is supported on the two inner rings 44b, 44c by tapered rollers 44d, 44e. The inner rings 44b, 44c have each a running surface. The two inner running surfaces are arranged at a radially outwardly opening obtuse angle. The bearing roller pins of each tapered roller annulus are interconnected by chains or rings 44f, 44g, 44h, 44i. The bearing 44 is preferably partially in the form of a moment bearing. The main moment support however is provided by the bearing 45 which may be in the form of a roller bearing. The roller or other rolling bodies may be provided with bearing pins which are interconnected by rings or chains extending at the front ends of the rolling bodies.

Of the two bearings 44, 45 preferably one is a fixed bearing and the other is a loose bearing. For example the bearing 44 is a fixed bearing which supports the hub 3 not only radially but also axially. The other bearing 45 only has radial support functions. But the arrangement may also be reversed. In the embodiment shown herein the hub 3 supported by the support tube extension 43 supports the support ring 28 which is connected to the rotor 29 via the support disc 30 and the flanges 36, 37. Otherwise the earlier description of the embodiment according to FIGS. 1 to 3 is supplemental.

The proposed generator arrangement preferably employs a generator 2 with an outer rotor 29. The main bearing or bearings 27, 44, 45 are arranged outside the generator. The outer rotor 29 of the generator 2 is connected to the hub 3 by way of a double walled support structure 30 including radial ribs or respectively web walls 33, 34. The inner stator 26 of the generator 2 is connected to the stationary hollow axle or, respectively, the support tube 9 by way of a double-walled support structure which includes radial ribs or, respectively web walls 20 to 24. The support tube 9 is flanged directly onto the machine carrier 4 and has a diameter selected as large as possible fitted to the main bearing structure. The main bearing structure may be in the form of the bearing 27 using a single bearing structure which accommodates forces and moments in five degrees of freedom. Alternatively, it may comprise two bearings 44, 45 in the form of a two-bearing arrangement.

With the arrangement of the main bearing structure disposed outside the generator, space is obtained for an optimal configuration of the support structure for the rotor and the stator. The double-walled support structures with radial ribs for the rotor and the stator provide for high strength and rigidity at a relatively low weight. In this way the vibration or oscillation behavior of the generator is optimized. A relatively low-cost and low-weight construction of the generator can be obtained. The arrangement of the main bearing or of the two main bearings near the hub 3 reduces the bearing load. The large diameter of the hollow support tube 9 also results in a sturdy rigid structure of relatively low weight. The access to the hub 3 is easy, at least in one of the embodiments. The machine carrier 4 includes no elements of the generator 2 and the bearing structure and therefore can be optimized with regard to strength and rigidity. The design of the generator 2 as a permanent magnet-excited external rotor synchro-generator has the advantage that the air gap diameter between the magnetically active parts and therefore the performance of the generator is better then with an internal rotor with the same outside dimensions.

With the generator arrangement according to the invention at least one main bearing is arranged between the generator and the hub wherein the rotor of the generator is supported only at one axial end by a rigid carrier in the form of a support disc 30. The support disc 30 is a hollow chamber structure of low weight and high rigidity.

REFERENCE NUMERALS 1 tower head
2 generator
3 hub
4 machine carrier
5 end
6 vertical axis
7 tower bearing
8 support structure, connecting structure
9 support tube
10 bolt
11 opening
13 center axis
14 mounting structure
15, 16 flanges
17 stator support structure
18 hub-side wall
19 gondola-side wall
20-24 web walls
25 cylinder support surface
26 stator
27 main bearing
28 support ring
29 rotor
30 support disc
31 hub-side wall
32 generator-side wall
33, 34 web walls
35 end wall
36, 37 flanges
38 end ring
39 permanent magnets
40 bolts 41 brake disc
42 brake calipers
43 support tube extension
44, 45 bearings

What is claimed is:

1. A generator arrangement for a wind power plant comprising:
  a central support tube (9) having one end including a connecting structure (8) adapted to connect to a machine carrier (4), the other end of the central support tube (9) in supportive relationship with a hub (3),
  a stator (26) arranged concentrically with and exteriorly to the support tube (9) via a stator support structure (17),
  a support ring (28) arranged concentrically with and exteriorly to the support tube (9) and the support ring (28) being rotatably supported on the support tube (9) proximate the other end of the support tube (9), the support ring (28) positioned adjacent to and axially offset from the stator support structure (17),
  rigid hollow chamber support disc (30) arranged concentrically with and exteriorly to the support ring (28), the support ring (28) adapted to connect to the rigid hollow chamber support disc (30), the rigid hollow chamber support disc (30) including a hub-side wall (31) and an oppositely disposed generator-side wall (32) arranged in spaced relationship with web walls (33, 34) disposed therebetween so as to form the rigid hollow chamber support disc (30), the generator-side wall (32) in supportive relationship with a rotor (29) which is arranged concentrically to the stator (26) and axially offset from the rigid hollow chamber support disc (30) and extends around the stator (26),
  the web walls (33, 34) are separating walls, which extend radially between the hub-side wall (31) and the generator-side wall (32) or the web walls (33, 34) are separating walls, which extend axially between the hub-side wall (31) and the generator-side wall (32) or the web walls (33, 34) are separating walls, which extend radially and axially between the hub-side wall (31) and the generator-side wall (32).

2. The generator arrangement according to claim 1, wherein the rotor (29) extends from the rigid hollow chamber support support disc (30) in a cantilevered fashion.

3. The generator arrangement according to claim 1, wherein the hub-side wall (31) is planar and arranged radially with respect to the support ring (28).

4. The generator arrangement according to claim 1, wherein the generator-side wall (32) is planar and arranged radially with respect to support ring (28).

5. The generator arrangement according to claim 1, wherein the rigid hollow chamber support disc (30) further includes a circumferential end wall (35) which encloses an interior space which is closed at the outer end by the circumferential end wall (35).

6. The generator arrangement according to claim 5, wherein the circumferential end wall (35) has a diameter corresponding essentially to the diameter of the rotor (29).

7. The generator arrangement according to claim 1, wherein the stator support structure (17) includes a bearing-side wall (18) and a gondola-side wall (19) which extend radially from the support tube (9).

8. The generator arrangement according to claim 7, wherein the stator support structure (17) further includes intermediate web walls (20-24), the bearing-side wall (18) and the gondola-side wall (19) are interconnected by the intermediate web walls (20-24).

9. The generator arrangement according to claim 8, wherein the intermediate web walls (20-24) extend in the radial direction.

10. The generator arrangement according to claim 8, wherein the intermediate web walls (20-24) extend in the axial direction.

11. The generator arrangement according to claim 1, further comprising a bearing arrangement (27), the support ring (28) is supported on the support tube (9) by means of the bearing arrangement (27).

12. The generator arrangement according to claim 11, wherein the bearing arrangement (27) comprises exclusively bearings arranged between the support ring (28) and the support tube (9).

13. The generator arrangement according to claim 1, further comprising a support tube extension (43) adapted to connect to the other end of the central support tube (9), the support tube extension (43) in supportive relationship with the hub (3), a bearing arrangement (44, 45) comprises at least two bearings (44, 45) axially spaced and operatively arranged between the hub (3) and the support tube (9) or the hub (3) and the support tube extension (43).

14. The generator arrangement according to claim 13, wherein one of said at least two bearings (44, 45) is operatively arranged proximate one end of the support tube extension (43) and another of said at least two bearings (44, 45) is operatively arranged proximate the other end of the support tube extension (43).

15. The generator according to claim 1, further comprising an annular brake disc (41) mounted between the support ring (28) and the hub (3), brake calipers (42) in connective relationship with the other end of the central support tube (9) and are in operative arrangement with the brake disc (41), whereby the hub (3) can be prevented from rotating as desired.

* * * * *

UNITED STATES PATENT AND TRADEMARK OFFICE
CERTIFICATE OF CORRECTION

PATENT NO. : 8,421,262 B2  
APPLICATION NO. : 12/661020  
DATED : April 16, 2013  
INVENTOR(S) : Andreas Lauke Page 1 of 1

It is certified that error appears in the above-identified patent and that said Letters Patent is hereby corrected as shown below:

On the title page, item (73), the Assignee's name instead of "Schuler Pressew GmbH & Co. KG," should read as follows:

(73) Assignee: Schuler Pressen GmbH & Co. KG,

Signed and Sealed this  
Thirteenth Day of August, 2013

Teresa Stanek Rea  
*Acting Director of the United States Patent and Trademark Office*